March 11, 1952    H. N. GRUSHON    2,588,518
CLOSURE AND CLOSURE OPERATOR FOR PIT MOUNTED AUTO LIFTS
Filed July 12, 1946    8 Sheets-Sheet 1

INVENTOR
HAROLD N. GRUSHON
BY
ATTORNEY

March 11, 1952 — H. N. GRUSHON — 2,588,518
CLOSURE AND CLOSURE OPERATOR FOR PIT MOUNTED AUTO LIFTS
Filed July 12, 1946 — 8 Sheets-Sheet 4

INVENTOR
HAROLD N. GRUSHON
BY
ATTORNEY

March 11, 1952  H. N. GRUSHON  2,588,518
CLOSURE AND CLOSURE OPERATOR FOR PIT MOUNTED AUTO LIFTS
Filed July 12, 1946  8 Sheets-Sheet 6

INVENTOR
HAROLD N. GRUSHON
BY
ATTORNEY

March 11, 1952     H. N. GRUSHON     2,588,518
CLOSURE AND CLOSURE OPERATOR FOR PIT MOUNTED AUTO LIFTS
Filed July 12, 1946     8 Sheets-Sheet 7

INVENTOR
HAROLD N GRUSHON
BY
ATTORNEY

March 11, 1952     H. N. GRUSHON     2,588,518
CLOSURE AND CLOSURE OPERATOR FOR PIT MOUNTED AUTO LIFTS
Filed July 12, 1946     8 Sheets-Sheet 8

INVENTOR
HAROLD N. GRUSHON
BY
ATTORNEY

Patented Mar. 11, 1952

2,588,518

UNITED STATES PATENT OFFICE 2,588,518

CLOSURE AND CLOSURE OPERATOR FOR PIT MOUNTED AUTO LIFTS

Harold N. Grushon, Dayton, Ohio, assignor to The Joyce-Cridland Company, Dayton, Ohio, a corporation of Ohio Application July 12, 1946, Serial No. 683,281

16 Claims. (Cl. 254—89)

This invention relates to an automobile lift and is particularly useful in connection with a two post lift, that is a lift comprising separate lifting mechanisms for the front and rear end axles of an automobile. Usually such lifting mechanisms are mounted beneath a floor or other surface which is provided with openings just large enough for the passage of the vertically movable lifting elements, and when the lift is in its lowered position the axle supporting members rest upon and extend above the surface of the floor. Consequently when the lift is not in use the adjacent portions of the floor cannot conveniently be used for other purposes. If the floor is provided with recesses to receive the axle supports, the recesses constitute a hazard for a workman who is moving about beneath the elevated automobile, and if the recesses are of such depth that the axle engaging parts of the axle supports are at or below the floor level when in their lowered positions portions of the recesses will be open and the floor surface will not be continuous.

One object of the invention is to provide an automobile lift which can be mounted as a whole below a floor having an opening or openings through which the vehicle supporting members, or superstructures, may move to and from elevated positions and which may be closed to provide a substantially smooth and continuous floor surface both when the lift is in its lowered position and when the lift is in its elevated position.

A further object of the invention is to provide a lift with a closure for said opening which is moved toward and from closed position under the control of the lifting mechanism.

A further object of the invention is to provide such a lift in which the closure actuating mechanism as a whole is below the floor.

A further object of the invention is to provide such a lift with efficient automatic closure operating mechanism.

A further object of the invention is to provide such an installation having means whereby the front and rear axles of an automobile may be accurately positioned with relation to the axle supports while the latter are below the floor and the closure closed.

A further object of the invention is to provide such an installation having means for automatically positioning the front axle of the automobile with relation to the front axle support while the latter is below the floor.

Other objects of the invention may appear as the apparatus is described in detail.

In the accompany drawings

In these drawings I have illustrated one embodiment of the invention and have shown the same as a two post lift, but it is to be understood that the lift may comprise a single lifting mechanism or a plurality of associated mechanisms, and that the mechanism as a whole, as well as the several parts thereof, may take various forms without departing from the spirit of the invention. It is also to be understood that the term "floor" as used herein is intended to include any suitable supporting surface, such as the floor of a garage, a pavement or the like.

Figure 1:
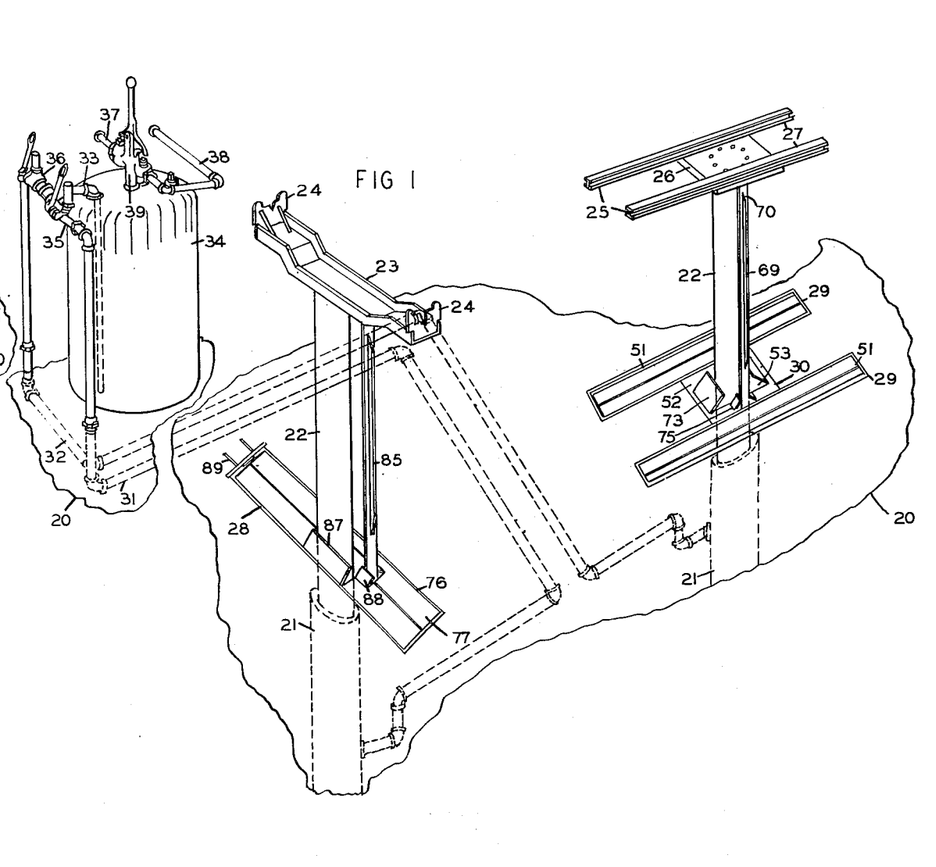
Fig. 1 is a schematic view of a two post lift embodying my invention.

In the form here illustrated the lift comprises two lifting mechanisms, or units, connected with a single source of power and having respectively means for supporting the front and rear axles of an automobile, but it will be obvious that a single lifting mechanism, could be used by providing the same with a superstructure adapted to support the load as a whole. In Fig. 1 the lift is shown schematically and comprises a front lifting mechanism A having a superstructure adapted to engage and support the front axle of an automobile, and a rear lifting mechanism B having a superstructure adapted to engage and support the rear axle of said automobile. Both lifting mechanisms are mounted below a floor 20 having openings through which the superstructures may pass. Separate openings are preferable as a single opening would be unnecessarily large, and each separate opening can be of a size and shape to correspond to the size and shape of the superstructure which moves through the same.

The lifting mechanisms may be operated in any suitable manner and are here shown as hydraulically operated. Each lifting mechanism comprises a cylinder 21, a lifting element, or ram, 22, and a superstructure on the lifting element to support the load. The superstructure for the front lifting unit comprises a transverse member 23 of a length sufficient to support the front axle of an automobile and in the present instance is provided with adjustable axle engaging members 24. The superstructure for the rear lifting unit comprises two rails 25 extending lengthwise of the automobile and of such length as to support the rear axles of automobiles of different lengths, the rails being mounted on a head 26 carried by the rear lifting element 22. The rails are preferably provided with axle engaging members 27.

The floor opening 28 for the front lifting unit is of a relatively long narrow shape and is just large enough to permit the free movement of the superstructure 23 through the same. In order that the opening for the rear lifting unit may not be unnecessarily large it is here shown as H-shape in form, thus providing relatively long narrow side portions 29 for the rails 25 and a cross portion 30 for the head 26.

Preferably the cylinders 21 of the two units are separately connected with a common source of supply for propellant liquid, usually oil, under pressure. In the present arrangement the cylinders are respectively connected by pipes 31 and 32 with a single pipe 33 which extends into a supply tank 34 to a point near the bottom thereof, the pipes 31 and 32 being provided with separately operable valves 35 and 36 adjacent the pipe 33. As shown in Fig. 1 the oil is discharged from the tank by air pressure, and for this purpose the upper portion of the tank 34 is connected with a source of air under pressure, not shown, by inlet and outlet pipes 37 and 38, the flow of air to and from the tank being controlled by a valve 39.

Figure 2:
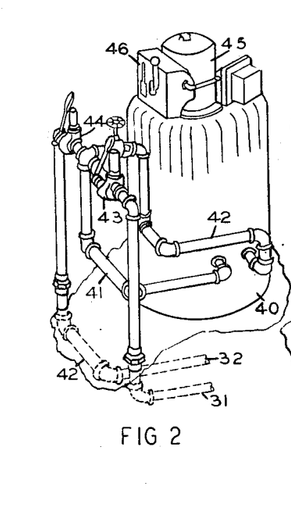
Fig. 2 is a perspective view of a modified supply tank.
Figure 3:
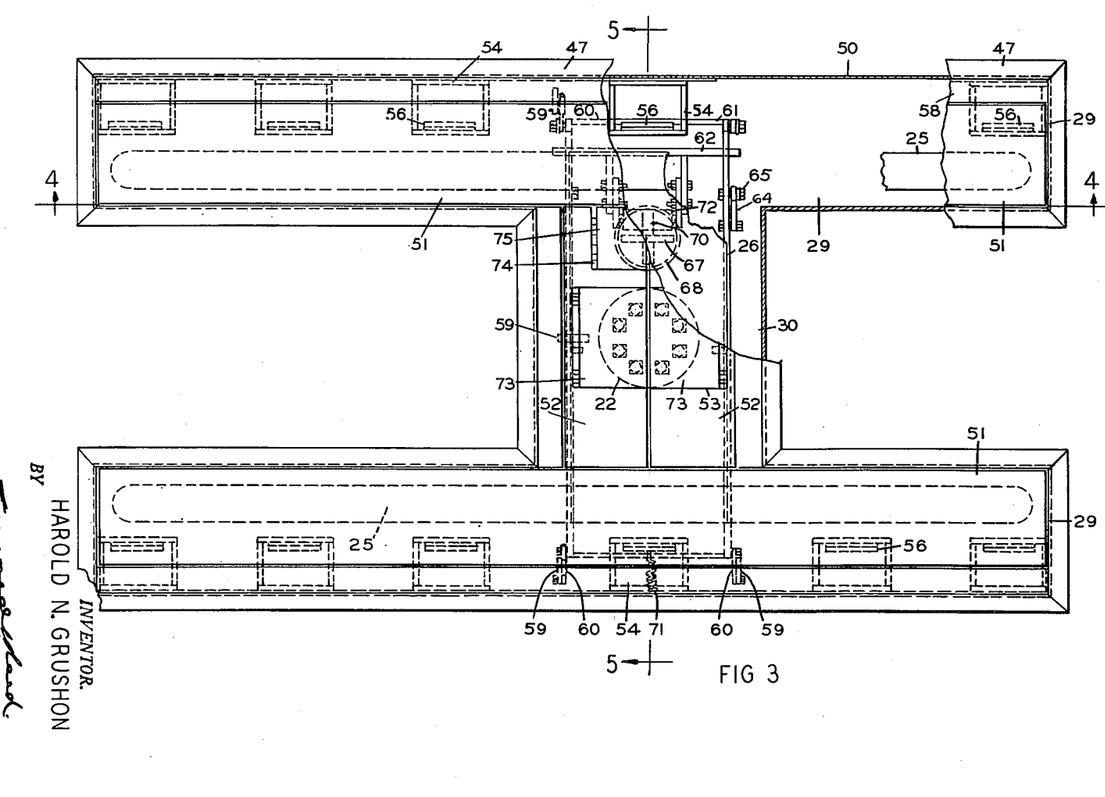
Fig. 3 is a plan view, partly broken away, of the rear lifting unit with the doors in their closed positions.
Figure 4:
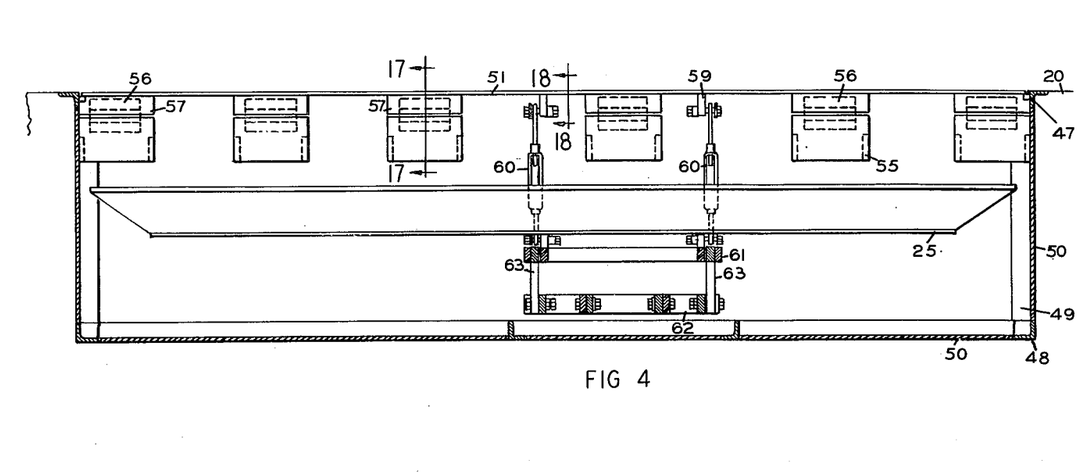
Fig. 4 is a section taken on the line 4—4 of Fig. 3.

As shown in Fig. 2 the oil is discharged from a tank 40 by a pump within the tank, not shown, and the pipes 31 and 32 are both connected with a discharge pipe 41 and with a return pipe 42, the connections being controlled by valves 43 and 44. The pump is driven by an electric motor 45 which is controlled by a switch, the operating arm of which is shown at 46. Both methods of discharging the oil from the tank are well known and form no part of the present invention except insofar as they enter into combination with other parts of the mechanism.

Each lifting mechanism is mounted below the floor with the upper end of the cylinder 21 spaced from the floor surface such a distance that when the lifting element is in its lowered position the superstructure carried thereby will be below the floor surface. Preferably a pit is formed below the floor opening and the cylinder is sunk in the ground in line with the opening and with its upper end close to the bottom of the pit, and the door operating mechanism is mounted within the pit on a suitable supporting structure. The doors may be of any suitable character and may be mounted in any suitable manner, as by pivotally connecting them with the supporting structure.

Figures 5, 6:
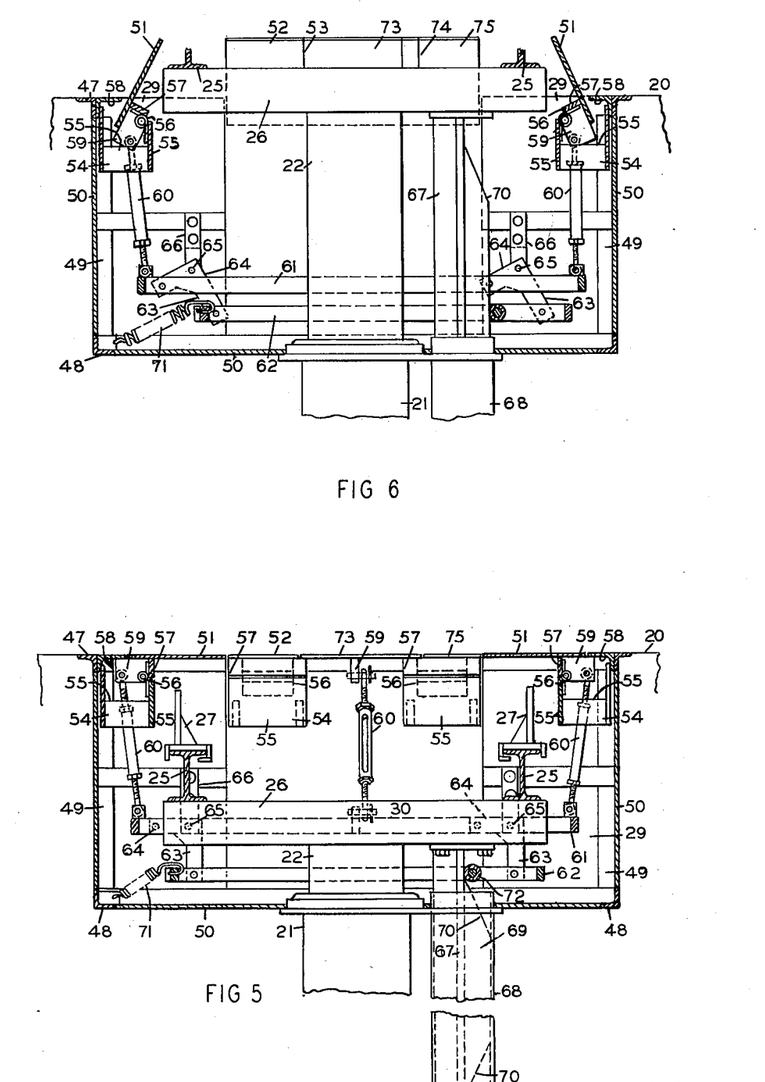
Fig. 5 is a transverse section on the line 5—5 of Fig. 3 with the doors closed.
Fig. 6 is a view similar to Fig. 5 with the doors open.
Figure 7:
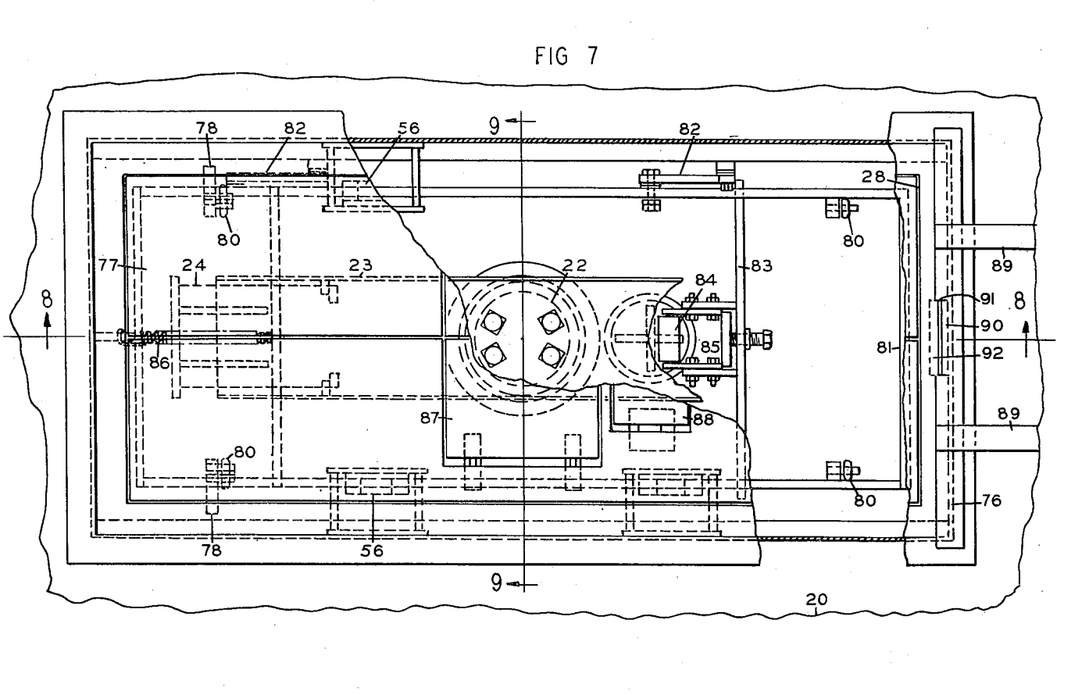
Fig. 7 is a top plan view partly broken away of the front unit showing the doors closed.
Figure 8:
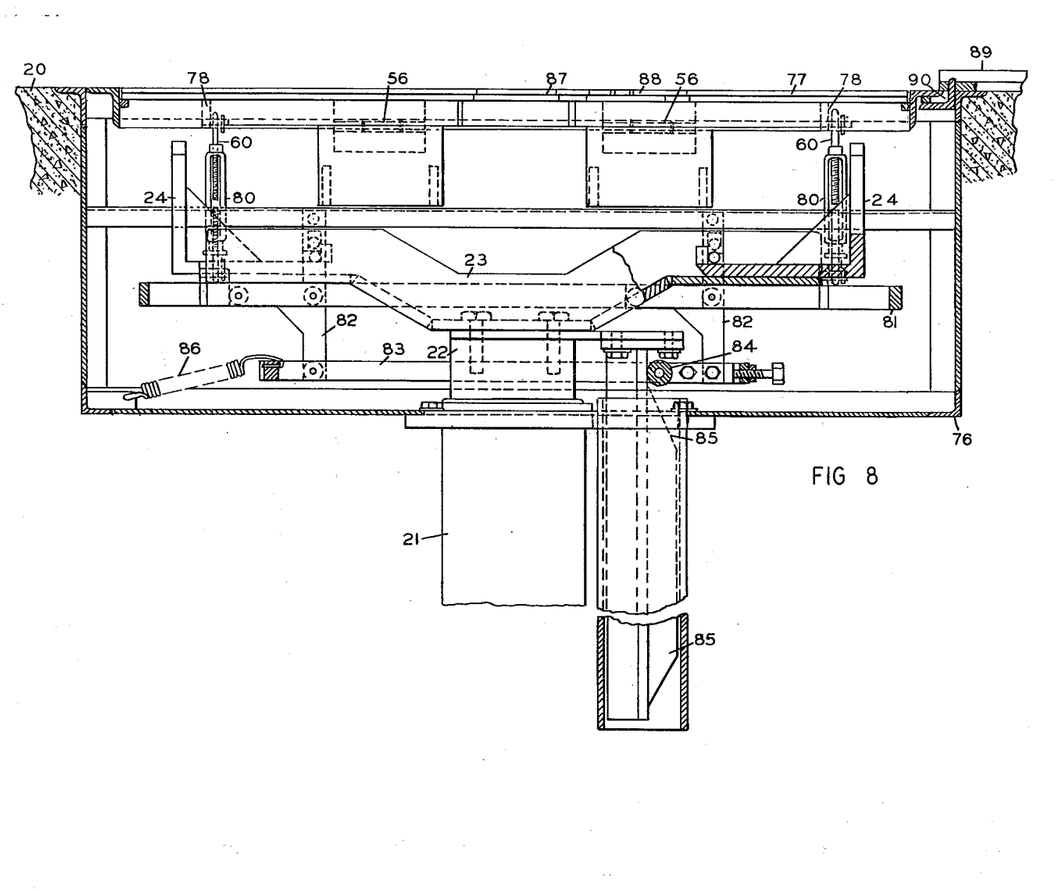
Fig. 8 is a longitudinal section taken on the line 8—8 of Fig. 7.
Figure 9:
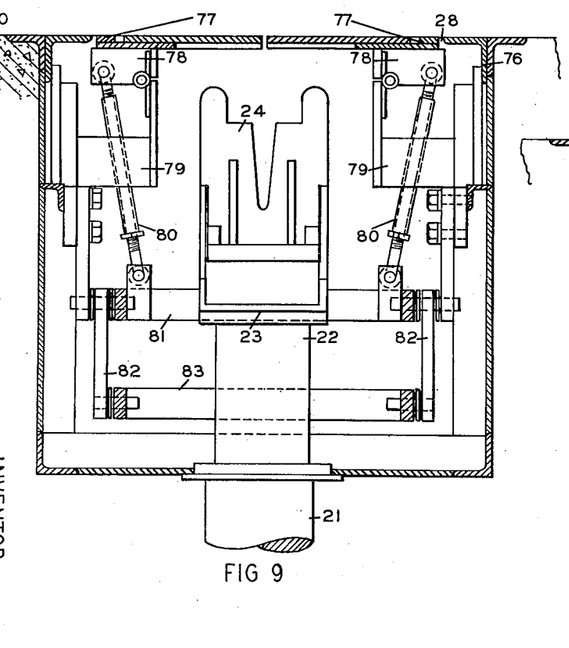
Fig. 9 is a transverse section taken on the line 9—9 of Fig. 7 showing the doors closed.
Figure 10:
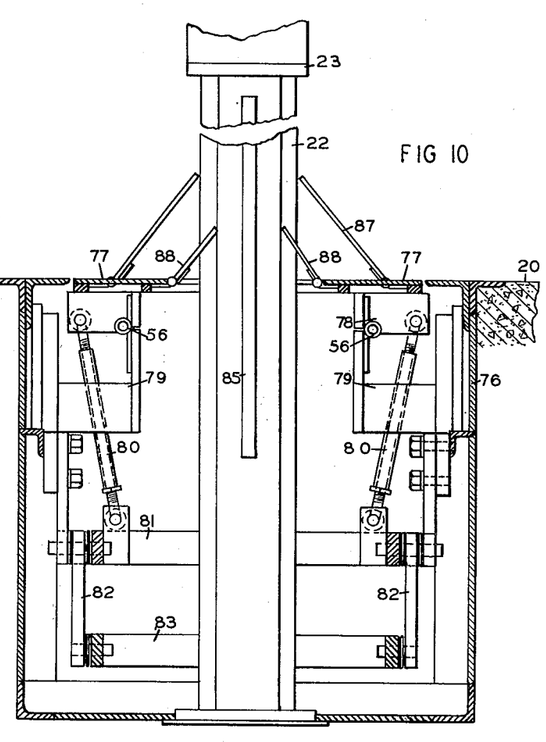
Fig. 10 is a similar section showing the positions of the doors when the lifting mechanism is fully elevated.
Figure 11:
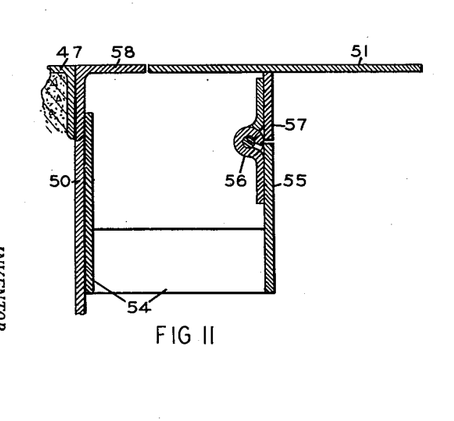
Fig. 11 is a sectional detailed view showing one of the door hinges.
Figure 12:
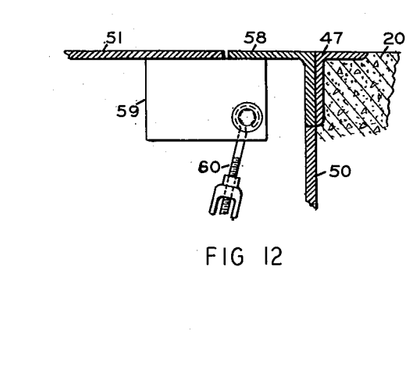
Fig. 12 is a sectional detail view showing one of the door actuating devices.

Referring first to the rear lifting unit, as best shown in Figs. 3 to 6, it will be noted that the supporting structure is in the nature of a boxlike frame comprising rectangular upper and lower frame members 47 and 48 and vertical frame members 49. Preferably the bottom and the sides of the frame are closed by metal plates 50 which form liners for the pit. This unit is provided with four doors movable into and out of positions to close the floor opening both when the lifting mechanism is in its lowered position and when it is in its elevated position. The side portions 29 of the opening for the rear unit are respectively closed by doors 51, and the cross opening is closed by transverse doors 52 which are provided with opposed recesses 53 to permit the doors 52 to be moved about the elevated lifting element 22 to their closed positions. Each door is mounted on the main frame for movement into and out of a position in which it is substantially flush with the floor surface. The doors may be mounted for movement into and out of closed positions in any suitable manner, but preferably they are pivotally mounted on the main frame. In the arrangement here shown the main frame is provided along the outer edge of each door with a plurality of brackets 54 which are secured to and extend inwardly from the frame just below the upper edge thereof, each bracket having an inner wall 55 spaced from and substantially parallel with the adjacent wall of the frame. Pivotally mounted on the wall 55 of each bracket, as by a hinge 56, is a pivot block 57 to which the corresponding door 51 is rigidly secured, as by welding. The block 57 is secured to the door a substantial distance from the outer edge thereof, so that when the door is moved about the axis of the hinge the outer portion of the door moves downwardly, as shown in Fig. 6. The door is moved about the hinge axis by actuating devices connected with lugs or blocks 59 welded, or otherwise rigidly secured, to the outer portion of a door and extending outwardly beyond the outer edge of the door so that when the door is in its closed position the block will engage the lower side of a flange 58 extending inwardly from the upper frame member and will thus rigidly support the door in a horizontal position substantially flush with the floor, the arrangement being such that when the blocks 59 are moved downwardly about the hinge axis the outer edge of the door will move below the inner edge of the frame, thus permitting the door to be moved to a substantially upright position. Connected with each lug 59 of the door is an actuating device 60 by which the door may be moved about its pivotal axis. In the present instance each actuating device is in the nature of a connecting rod pivotally connected with the corresponding lug 59 at a point spaced outwardly from the hinge axis and extending downwardly from the lug so that a downward pull thereon will move the door toward its open position. The actuating device is here shown as including a turn-buckle so that its effective length may be easily changed.

The several actuating devices 60 are connected with an operating mechanism which is here shown as a vertically movable member which is preferably in the form of a rectangular frame 61 through which the lifting element and superstructure may move. Vertical movement is imparted to the operating member 61 by a second member 62 which is also preferably rectangular in form and is supported for horizontal movement under the control of the lifting element. In the present arrangement the member 62 is below the member 61 and is connected with the downwardly extending arms 63 of bell cranks, the horizontal arms 64 of which are pivotally connected with the vertically movable member 61, the bell cranks being pivotally mounted at 65 on parts 66 rigid with the main frame. Thus the horizontal movement of the lower member 62 imparts vertical movement to the upper member 61. The lower member 62 is actuated in one direction by a cam which is connected with and moves with the lifting element, and is actuated in the other direction by a spring 71 which connects the same with the main frame. In the present construction a rigid upright member 67 is rigidly secured to and extends downwardly from the head 26 of the lifting element alongside of the cylinder 20 where it is guided and held against lateral deflection by a casing 68 which is sunk in the ground. Rigid with the member 67 and preferably formed integral therewith is an elongate vertical cam 69 having at its upper and lower ends oppositely inclined cam surfaces 70. Cooperating with these cam surfaces is a roller 72 which is mounted on the lower frame 62 and is held in contact with the cam member by the spring 71. When the lifting element is in its lowered position the roller contacts the member 67 just above the upper cam surface and the vertically movable operating member 61 is retained in its elevated position. The initial movement of the lifting element 22 causes the upper cam surface to engage the roller and move the lower operating member 62 in such a direction that the bell cranks move the upper member 61 downwardly and thereby move the doors to their open positions. During the continued movement of the lifting element the roller rides on the straight edge of the cam member and retains the doors in their open positions until the lifting element has completed a predetermined upward movement, at which time the lower cam surface 70 is engaged by the roller 72 and the spring 71 is permitted to move the lower operating member 62 to its normal position, thereby moving the upper operating member 61 downwardly and closing the doors. When the lifting element next moves downwardly the lower cam surface 70 will actuate the operating mechanism to open the doors and the upper cam surface will permit the same to close after the superstructure has passed through the floor opening.

In order to close the recesses 53 in the cross doors 52 when the lift is in its lowermost position, and thus completely close the floor opening, the doors 52 are provided with supplemental doors 73 which are preferably hinged at their outer edges to the respective main doors 52 and are so connected therewith that when the main doors are in their closed positions, and the superstructure is below the floor, the supplemental doors will close the recesses and will be supported substantially flush with the main doors and with the floor surface. The cross doors are also provided with recesses 74 to permit the passage of the cam supporting member 67, and these recesses are closed by small supplemental doors 75 similar to the supplemental doors 73. The supplemental doors 73 and 75 are so connected with the main doors that they will move therewith in opening direction, but the main doors are free to move in closing direction with relation to the supplemental doors. Thus when the main doors are closed after the superstructure has moved above the same the supplemental doors 73 and 75, respectively, will engage the lifting element and the cam supporting member and will be retained thereby in inclined positions in which they substantially close the respective recesses.

The front lifting unit is provided with a box-like frame 76 substantially similar to the frame of the rear lifting unit. Mounted on this frame at opposite sides of the opening 28 are doors 77 each of which is secured to a pivot block 78 which is connected by a hinge 78a with a bracket 79, with which is connected an actuating device, or devices, 80, all in the manner above described. The actuating devices for both doors are connected with an upper vertically movable operating member 81 which is connected by bell cranks 82 with a lower horizontally movable operating member 83, in the manner above described. The lower operating member 83 is provided with a roller 84 which engages a cam member 85 connected with the lifting element 21 and moves the lower member 83 against the action of a spring 86 to open the doors simultaneously. Thus as the lifting element moves upwardly the doors are opened and then closed just before the superstructure reaches its elevated position, and upon the downward movement of the lifting element the doors are opened and then closed after the lifting element had passed below the floor. The doors 77 are provided with two pairs of opposed recesses to receive the lifting element and the cam supporting member when the doors are closed while the lifting element is in an elevated position and these recesses are provided with supplemental doors 87 and 88 which engage respectively the lifting element and the cam support and substantially close the corresponding recesses.

It will be apparent, therefore, that when both lifting units are in their lowered positions the doors are substantially flush with the floor and the floor surface is continuous. Thus workmen and vehicles may move over the closed doors, which offer no obstruction to traffic over the same. When the lift is in its elevated position the floor openings are also closed, and there are no openings or recesses beneath the elevated vehicle into which a workman might step or fall. Even those portions of the recesses in the doors which are not occupied by the lifting element and can support are closed by the inclined supplemental doors to such an extent that it is impossible for the foot of a workman to enter the same.

Figures 13, 14, 15:
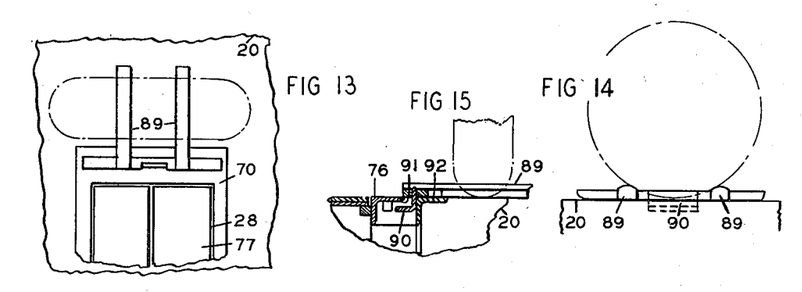
Fig. 13 is a plan view of a wheel positioning device.
Fig. 14 is an end elevation of the wheel positioning device.
Fig. 15 is an edge view of the wheel positioning device showing its connection with the frame structure.

Inasmuch as the doors are closed when a vehicle to be serviced is driven above the lift it is desirable that some means be provided for accurately positioning the vehicle with relation to superstructures, this being particularly important in connection with the front unit because of the narrow width of the axle supporting member. I have, therefore, provided at one end of the opening 28 two bars 89 which are supported on the floor surface and extend lengthwise some distance beyond the opening 28 and are spaced one from the other a distance sufficient to permit an automobile wheel to rest upon the floor between members in approximate engagement with both of them. The members 89 are of a height which will permit a wheel to be driven over the same but will offer sufficient resistance to the movement of the wheel to inform the driver when the front wheel is seated between these two members. These two members may be mounted in any suitable manner, but as here shown they are provided at their inner edges with angle lugs 90 which enter a slot 91 in the floor surface and engage against an outwardly extending flange 92 of the upper frame member.

Figure 16:
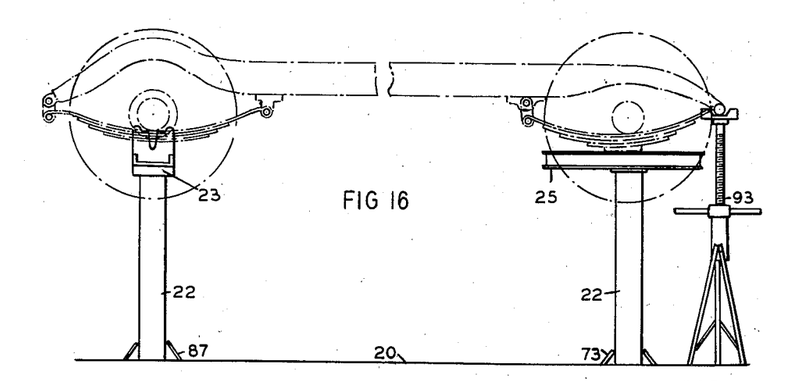
Fig. 16 is a schematic view showing the lift in its elevated position with the rear end of the automobile frame supported by jacks independently of the rear lift mechanism.
Figure 17:
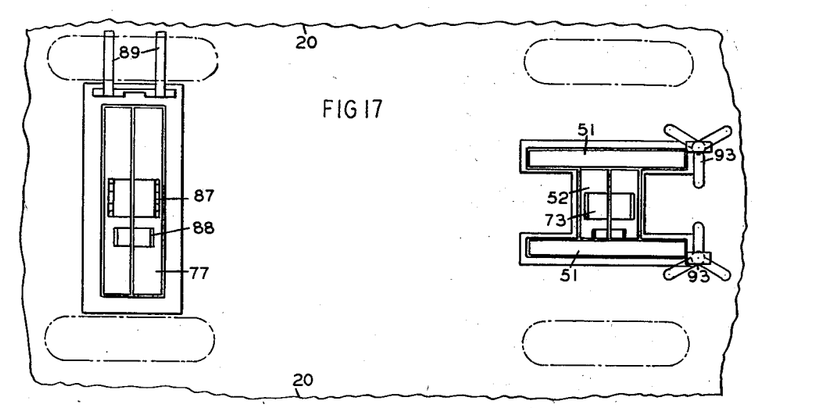
Fig. 17 is a plan view of the two units showing the positions of the jacks with relation thereto.

A further advantage of this mechanism is that it permits a jack or other support to be placed on the floor above or close to the floor openings when the latter are closed. As shown in Fig. 16 lifting jacks 93 may thus be engaged with the rear end of the automobile frame and the rear lifting mechanism lowered so that the axle is supported wholly or partly by the rear springs, thus permitting ready access to the springs for the purpose of introducing lubricant between the leaves thereof or for other servicing, or the axle may be supported on the lift while the rear end of the frame is supported on the jack so as to permit the ready removal and replacement of a spring or springs.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In an apparatus for opening and closing a pit for a lifting mechanism of the type including a lifting element and a load supporting structure carried by said lifting element and movable thereby into and out of said pit, a closure for said pit comprising a plurality of doors movable about separate axes, a closure operating device mounted in said pit below the lowermost position of said load supporting structure, separate means for connecting said doors with said operating device for simultaneous movement thereby, said operating device having a cam engaging part, a vertically movable cam to engage said cam engaging part and actuate said operating device, said cam including one cam surface to move said operating device in closure opening direction when said cam moves upwardly and in closure closing direction when said cam moves downwardly, said cam including a second cam surface to move said operating device in closure closing direction when said cam moves upwardly and in closure opening direction when said cam moves downwardly, said cam also having a part between said cam surfaces to retain said closure in its open position until said load supporting structure has moved beyond the same, and means for actuating said cam in timed relation to the movement of said lifting mechanism.

2. In an apparatus for opening and closing a pit for a lifting mechanism of the type including a lifting element and a load supporting structure carried by said lifting element and movable thereby into and out of said pit, a closure for said pit comprising a plurality of doors movable about separate axes, a closure operating device mounted in said pit below the lowermost position of said load supporting structure, separate means for connecting said doors with said operating device for simultaneous movement thereby, said operating device having a cam engaging part, an elongate member connected with said load supporting structure and extending downwardly therefrom, cam surfaces carried by said elongate member in cooperative relation to said cam engaging part, and including one cam surface to move said operating device in closure opening direction when said lifting mechanism moves in one direction and in closure closing direction when said lifting mechanism moves in the other direction, and a second cam surface to move said operating device in closure closing direction when said lifting mechanism moves in first mentioned direction and in closure opening position when said lifting device moves in the last mentioned direction.

3. In an apparatus for opening and closing a pit for a lifting mechanism of the type including a lifting element and a load supporting structure carried by said lifting element and movable thereby into and out of said pit, a movable closure for said pit, a closure operating mechanism including an arm movable about an axis in said pit, means operatively connecting said arm with said closure, cam means for actuating said operating mechanism to move said arm about said axis in one direction to open said closure and in the other direction to close said closure while said cam means moves in a single direction, and means for connecting said cam means with said lifting mechanism for movement thereby.

4. In an apparatus for opening and closing a pit for a lifting mechanism of the type including a lifting element and a load supporting structure carried by said lifting element and movable thereby into and out of said pit, a movable closure for said pit, a closure operating mechanism including an arm movable about an axis in said pit, means operatively connecting said arm with said closure, cam means for actuating said operating mechanism to move said arm about said axis in one direction to open said closure and in the other direction to close said closure while said cam means moves in a single direction, said cam means including a movable member connected with said arm to move the same about its said axis, an elongate cam element having cam surfaces to move said movable member in opposite directions, and means for connecting said cam element with said lifting mechanism for movement thereby.

5. A closure controlling mechanism for a pit adapted to receive a lifting mechanism, comprising in combination with a pit closure which is movable to a closed position above the superstructure of a lifting mechanism in said pit when said superstructure is in its lowermost position, a closure actuating device, a vertically movable structure operatively connected with said actuating device, a horizontally movable structure, means actuated by said horizontally movable structure to actuate said vertically movable structure, a cam connected with said lifting mechanism for movement thereby to move said horizontally movable structure in one direction, and spring means for moving said horizontally movable structure in the other direction.

6. In combination with a lifting mechanism adapted to be mounted below an opening in a floor and having a part movable through said opening, a movable closure for said opening, said closure comprising two parts one of which is movable with relation to the other, an actuating device for moving the two parts of said closure simultaneously to open position, one part of said closure being movable to closed position while the other part thereof remains in an at least partially open position, and means controlled by said lifting mechanism for operating said actuating device.

7. In combination with a lifting mechanism adapted to be mounted below an opening in a floor and including a lifting element and a load supporting part carried by said lifting element and movable through said opening, a closure for said opening comprising two members supported at opposite sides of said opening for movement to and from closing positions, said members having opposed recesses through which said lifting element may extend when said members are in their closed positions, supplemental closures movable with relation to the respective members to close said recesses when said lifting element is in its lowered position, said supplemental closures being movable with the respective closure members to open positions and being adapted to engage said lifting element when the latter is in its elevated position and to be retained in partially open positions when said closure members move to closing positions, and means controlled by said lifting mechanism to actuate said closure members.

8. In a mechanism of the character described, a frame adapted to be mounted below an opening in a floor, doors pivotally mounted on said frame for movement into and out of positions to close said opening, a lifting mechanism adapted to be mounted below said opening and including a part movable through said opening, a controlling member connected with said part of said lifting mechanism for vertical movement therewith, and means supported by said frame below said opening and controlled by said controlling member to move said doors to open positions when said part of said lifting mechanism approaches said opening from above or below and to cause said doors to be moved to closed positions when said part of said lifting mechanism has passed beyond said opening.

9. In a mechanism of the character described, a frame adapted to be mounted below an opening in a floor, doors pivotally mounted on said frame for movement into and out of positions to close said opening, a lifting mechanism adapted to be mounted below said opening and including a part movable through said opening, an elongate vertical cam member connected with said lifting mechanism for movement thereby and having vertically spaced oppositely inclined cam surfaces a vertically movable structure supported by said frame and operatively connected with said doors, a horizontally movable structure supported below said opening and having a part to engage said cam member and move said horizontally movable structure in one direction, spring means to move said horizontally movable structure in the other direction, and means actuated by said horizontally movable structure for imparting vertical movement to said vertically movable structure.

10. In a mechanism of the character described, a frame adapted to be mounted below an opening in a floor, doors pivotally mounted on said frame for movement into and out of positions to close said opening, a lifting mechanism adapted to be mounted below said opening and including a part movable through said opening, an elongate vertical cam member connected with said lifting mechanism for movement thereby and having vertically spaced oppositely inclined cam surfaces, door operating mechanism below said opening including a vertically movable structure supported by said frame and operatively connected with said doors, a horizontally movable structure having a part to engage said cam member and move said horizontally movable structure in one direction, spring means to move said horizontally movable structure in the other direction, and bell cranks pivotally supported on said frame and each having one arm connected with said horizontally movable structure and its other arm connected with said vertically movable structure 11. A two post automobile lift comprising two lifting mechanisms adapted to be mounted below spaced openings in a floor, each lifting mechanism including a lifting element movable through the corresponding opening and a superstructure on the upper end of said lifting element, said superstructure being movable to positions below said floor when the respective lifting elements are lowered, frames adapted to be mounted beneath the respective openings, a pair of doors pivotally mounted on each frame on opposite sides of the path of the corresponding lifting element and movable to and from closed positions in which they are substantially flush with the floor surface, the doors of each pair having opposed recesses to receive said corresponding lifting element and permit said doors to close while said lifting element is in its elevated position, and means controlled by the respective lifting mechanisms to open said doors as said superstructures approach the same and to release said doors for movement to their closed positions after said superstructures have passed through the respective openings.

12. A two post automobile lift comprising two lifting mechanisms adapted to be mounted below spaced openings in a floor, each lifting mechanism including a lifting element movable through the corresponding opening and a superstructure on the upper end of said lifting element, said superstructures being movable to positions below said floor when the respective lifting elements are lowered, frames adapted to be mounted beneath the respective openings, a pair of doors pivotally mounted on each frame on opposite sides of the path of the corresponding lifting element and movable to and from closed positions in which they are substantially flush with the floor surface, the doors of each pair having opposed recesses to receive said corresponding lifting element and permit said doors to close while said lifting element is in its elevated position, actuating devices for the doors of the respective pairs of doors, cams connected with the respective lifting elements, and means controlled by said cams to move the corresponding actuating device in door opening directions during the initial portion of the movements of said lifting elements in either direction, and for releasing said actuating devices for movement in door closing direction during the final portion of the movement of said lifting elements.

13. A two post automobile lift comprising two lifting mechanisms adapted to be mounted below spaced openings in a floor, each lifting mechanism including a lifting element movable through the corresponding opening and a superstructure on the upper end of said lifting element, said superstructure being movable to positions below said floor when the respective lifting elements are lowered, frames adapted to be mounted beneath the respective openings, a pair of hinged doors mounted on each frame on opposite sides of the path of the corresponding lifting element and movable to and from closed positions in which they are substantially flush with the floor surface, the doors of each pair having opposed recesses to receive said corresponding lifting element and permit said doors to close while said lifting element is in its elevated position, actuating devices for the doors of the respective pairs of doors, cams connected with the respective lifting elements, and means controlled by said cams to move the corresponding actuating devices in door opening directions during the initial portion of the movements of said lifting elements in either direction, spring means for moving said actuating devices in door closing direction during the final portions of the movements of the respective lifting elements and operable means for selectively controlling the movements of said lifting elements.

14. In combination with a lifting mechanism comprising a vertically reciprocatory lifting element, adapted to be mounted below an opening in a floor, and a superstructure carried by said lifting element and movable thereby through said opening, a closure for said opening comprising two parts pivotally supported adjacent opposite edges of said opening for movement to and from positions substantially flush with said floor, actuating members connected with the respective parts of said closure and extending downwardly therefrom, operating mechanism below said closure operatively connected with said actuating members, and means connected with said lifting mechanism and supported below said superstructure for imparting movement to said operating mechanism to move said closure actuating members in closure opening direction as said superstructure approaches said opening and then in closing direction after said superstructure has passed through said opening.

15. In combination with a lifting mechanism comprising a vertically reciprocatory lifting element, adapted to be mounted below an opening in a floor, and a superstructure carried by said lifting element and movable thereby through said opening, a closure for said opening comprising two parts pivotally supported adjacent opposite edges of said opening for movement to and from positions substantially flush with said floor, actuating members connected with the respective parts of said closure and extending downwardly therefrom, operating mechanism below said closure operatively connected with said actuating members and having a cam engaging part, and a cam extending lengthwise of and rigidly connected with said lifting element below said superstructure and arranged to actuate the cam engaging part of said operating mechanism, said cam having its upper and lower end portions inclined in opposite directions and having an intermediate portion substantially parallel with said lifting element, said cam being so arranged that upon the movement of said lifting mechanism in either direction the leading inclined portion of said cam will move said operating mechanism in a direction to move said closure to open position, the intermediate portion of said cam will retain said closure in open position until said superstructure has passed through said opening and the trailing inclined surface will then release said closure for movement to closed position.

16. In combination with a lifting mechanism comprising a vertically reciprocatory lifting element adapted to be mounted below an opening in a floor, and a superstructure carried by said lifting element, a closure for said opening comprising two doors pivotally supported adjacent opposite edges of said opening for movement to and from positions substantially flush with said floor, actuating members connected with the respective doors and extending downwardly therefrom, operating mechanism below said closure operatively connected with said actuating members, and means connected with said lifting mechanism and supported below said superstructure for imparting movement to said operating mechanism to move said door actuating members in closure opening direction as said superstructure approaches said opening and then in closure closing position after said superstructure has passed through said opening, each of said doors having two parts movable about a common axis to door opening position when said lifting mechanism moves in either direction and to door closing position when said superstructure is below said floor, one of said parts being movable to closing position while the other of said parts remains in a partially open position when said superstructure is above said floor.

HAROLD N. GRUSHON.

REFERENCES CITED

The following references are of record in the file of this patent:

UNITED STATES PATENTS

| Number | Name | Date |
|---|---|---|
| 75,220 | Thompson | Mar. 3, 1868 |
| 530,776 | Houser et al. | Dec. 11, 1894 |
| 548,606 | Coe et al. | Oct. 22, 1895 |
| 760,139 | McGee | May 17, 1904 |
| 847,858 | Ware | Mar. 19, 1907 |
| 1,185,166 | Birosh | May 30, 1916 |
| 1,470,581 | Duffy | Oct. 9, 1923 |
| 2,015,357 | Weaver | Sept. 24, 1935 |
| 2,262,121 | Snider | Nov. 11, 1941 |
| 2,464,731 | Thompson | Mar. 15, 1949 |